(12) United States Patent
Spencer (10) Patent No.: US 7,673,556 B2
(45) Date of Patent: Mar. 9, 2010

(54) COFFEE MAKER AND METHOD OF USE

(76) Inventor: William L. Spencer, 1919 NW. 19th Ave., Portland, OR (US) 97209-1735

( * ) Notice: Subject to any disclaimer, the term of this patent is extended or adjusted under 35 U.S.C. 154(b) by 1227 days.

(21) Appl. No.: 11/185,224

(22) Filed: Jul. 19, 2005

(65) Prior Publication Data

US 2006/0011067 A1    Jan. 19, 2006

Related U.S. Application Data

(60) Provisional application No. 60/589,354, filed on Jul. 19, 2004.

(51) Int. Cl.
A47J 31/00    (2006.01)

(52) U.S. Cl. ............... 99/283; 99/280; 99/285; 99/299

(58) Field of Classification Search ............ 99/280, 99/283, 285, 299
See application file for complete search history.

(56) References Cited

U.S. PATENT DOCUMENTS

| | | |
|---|---|---|
| 1,748,234 A | 2/1930 | Loeb |
| 2,282,384 A | 5/1942 | Schenk |
| 2,558,536 A | 6/1951 | Bruder |
| 3,036,512 A | 5/1962 | Tarrant et al. |
| D202,462 S | 10/1965 | Lofgren |
| 3,771,432 A | 11/1973 | Karlen ............... 99/304 |
| 3,979,221 A | 9/1976 | Roberts ............. 134/99 |
| 4,468,406 A | 8/1984 | d'Alayer de Costemore d'Arc .... 426/231 |
| 4,608,916 A | 9/1986 | Becker et al. ......... 99/283 |
| 4,630,532 A | 12/1986 | Sonnentag et al. ....... 99/279 |
| 4,662,271 A | 5/1987 | Woltermann ........... 99/299 |
| 4,694,738 A | 9/1987 | Tarozzi ............... 99/279 |
| 4,728,281 A | 3/1988 | McGuffin et al. ........ 99/279 |
| 4,742,767 A | 5/1988 | Komatsu et al. ......... 99/280 |
| 4,757,754 A | 7/1988 | Welker ............... 99/307 |
| 4,872,403 A | 10/1989 | LaGesse et al. ......... 99/280 |
| 4,875,408 A * | 10/1989 | McGee ............... 99/283 |
| 5,063,836 A | 11/1991 | Patel ................. 99/281 |
| 5,158,793 A | 10/1992 | Helbling ............. 426/231 |
| 5,168,794 A | 12/1992 | Glucksman ............ 99/295 |
| 5,342,518 A | 8/1994 | Posner et al. .......... 210/232 |

(Continued)

FOREIGN PATENT DOCUMENTS

DE    1121089    2/1957

(Continued)

OTHER PUBLICATIONS

Mielie web site http://www.miele.com/usa/cva.html.

*Primary Examiner*—Reginald L Alexander
(74) *Attorney, Agent, or Firm*—Marger Johnson & McCollom, P.C.

(57) ABSTRACT

A coffee maker is provided that is structured to control the temperature of water entering the brewing area, releasably secure a coffee pot in the coffee maker, detect the presence or absence of a coffee pot or mug in the coffee maker, provide a seal between the brewing basket and coffee maker to prevent excess steam from escaping and provide a water supply pressure detection system. A structure for preventing water leaking from an in-wall coffee maker from entering a wall cavity is also provided. A system and method of filtering sediment from water supplied to a coffee maker or other appliance is also provided.

15 Claims, 12 Drawing Sheets

U.S. PATENT DOCUMENTS

| | | | | |
|---|---|---|---|---|
| 5,359,820 | A | | 11/1994 | McKay .......................... 52/34 |
| 5,539,856 | A | | 7/1996 | Andrew et al. ............. 392/467 |
| 5,562,163 | A | | 10/1996 | Sartain et al. ................ 169/51 |
| 5,699,719 | A | | 12/1997 | Lucas et al. .................. 99/299 |
| 5,718,162 | A | * | 2/1998 | Hoover ........................ 99/280 |
| 5,738,001 | A | | 4/1998 | Liverani ...................... 99/283 |
| 5,858,437 | A | | 1/1999 | Anson ........................ 426/431 |
| 6,098,525 | A | * | 8/2000 | Gijzel et al. ................. 99/282 |
| 6,100,488 | A | * | 8/2000 | Satake et al. ................ 209/580 |
| RE37,173 | E | * | 5/2001 | Jefferson et al. ............. 99/299 |
| 6,227,101 | B1 | | 5/2001 | Rabadi et al. ................ 99/280 |
| 6,253,663 | B1 | | 7/2001 | Spencer | |
| 6,405,637 | B1 | | 6/2002 | Cai ............................. 99/293 |
| 6,661,968 | B2 | | 12/2003 | Beaulieu .................... 392/471 |
| 6,779,435 | B1 | | 8/2004 | Iacobucci .................... 99/302 |
| 6,892,626 | B2 | | 5/2005 | Spencer | |
| 2004/0060448 | A1 | | 4/2004 | Chan et al. ................... 99/279 |
| 2005/0051033 | A1 | * | 3/2005 | Lassota ....................... 99/283 |
| 2007/0243294 | A1 | * | 10/2007 | Hayes et al. .............. 99/323.3 |

FOREIGN PATENT DOCUMENTS

| | | |
|---|---|---|
| FR | 1128462 | 3/1955 |
| JP | 3295515 | 12/1991 |

* cited by examiner

COFFEE MAKER AND METHOD OF USE

CROSS-REFERENCE TO RELATED APPLICATIONS

This application claims priority from U.S. Provisional Patent Application Ser. No. 60/589,354 filed on Jul. 19, 2004, whose contents are incorporated herein for all purposes.

BACKGROUND OF THE INVENTION

This disclosure relates to automatic coffee makers for home use including coffee makers that are built into a wall of a dwelling, recreational structure or vehicle. This disclosure also relates to self-filling home and commercial coffee makers.

Even though coffee makers are commonly found and used in homes and businesses throughout the world, these coffee makers still have potential problems that can cause minor or major headaches for the consumer.

One common problem with coffee makers is a lack of precise control of the temperature of the water brewing the coffee beans. Most coffee makers simply boil water in a reservoir to heat the water and produce enough pressure and/or steam to force the water into the brewing area. For optimal taste, however, coffee beans should ideally be brewed at a temperature of between about 195-205° F. which is below the boiling temperature of water. The Specialty Coffee Association of America considers this water temperature range to be an essential element of properly brewing great coffee.

Another problem is the overflow of water in the brewing basket when a coffee pot is removed during the middle of the brewing process. Commonly found pause-and-serve valves located on the brewing basket prevent coffee from being dispensed from the brewing basket when a coffee pot is removed. The pause-and-serve valve, however, does not stop water from continuing to enter the brewing basket and thus a messy overflow of the basket can still occur.

Another problem can occur with coffee makers located beneath cabinets or other structures when excess steam escapes the brewing area during the brewing process. Continued exposure of this excess steam can result in heat and/or moisture damage to the overlying cabinets or other structures. This problem can be prevalent with in-wall coffee makers as it is a popular choice to locate an in-wall coffee maker off of a counter and below a cabinet to conserve kitchen space.

Using coffee makers in unstable environments such as recreational vehicles (RVs) and boats can present yet another problem. The coffee pot can potentially fall out of the coffee maker either during the brewing process or after the brewing process when the coffee pot contains hot, messy coffee.

Coffee makers utilizing dedicated water supplies, such as can be used with in-wall coffee makers, can be damaged if the water pressure drops too low and the coffee maker continues to attempt a brewing process. The low pressure can drastically reduce the amount of water in the coffee maker which can result at least in a poor batch of coffee and possibly even permanent damage to the coffee maker or its components.

Water-supplied coffee makers (and other appliances utilizing dedicated water supplies) also need a clean supply of water to ensure the coffee maker (or other appliance) does not get clogged with small bits of debris which could damage the coffee maker (or other appliance). Currently bulky, expensive and sometimes hard to reach filters are used to filter out particulate matter if a filter is used at all.

A problem particular to in-wall coffee makers is the potential damage from a leaky coffee maker. With the coffee maker installed in a wall cavity, any water leaking from a faulty coffee maker could make its way into the wall causing hard to reach water damage.

It is desirable to solve these problems for coffee makers, in-wall coffee makers and other appliances.

DETAILED DESCRIPTION

Figure 1:
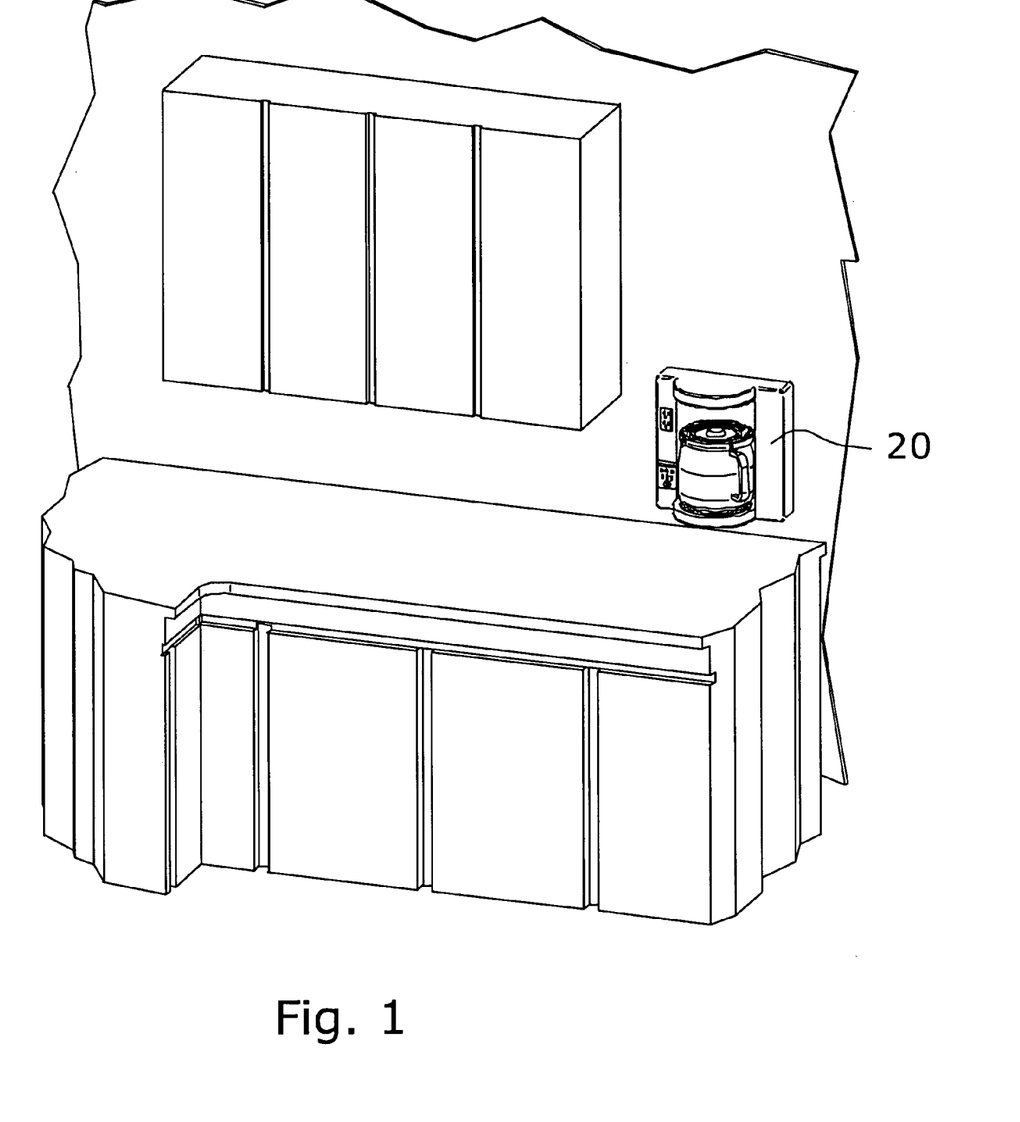
FIG. 1 is a perspective view of an in-wall or on-wall coffee maker according to embodiments of the invention.

FIG. 1 is a perspective view of an in-wall or on-wall coffee maker 20 according to embodiments of the invention. The in-wall or on-wall coffee maker 20 is convenient because it can occupy or protrude over minimal counter space or be affixed to a wall or cabinet that includes a dedicated water supply eliminating the need to manually fill the coffee maker 20 with water.

Many advantages of an in-wall coffee maker 20 are described in U.S. Pat. Nos. 6,253,663 and 6,892,626 to Spencer (the '663 and '626 patents) including the utilization of a mounting box for installation of the coffee maker and utilization of an in-line water heater within the coffee maker. The '663 and '626 patents are owned by the same inventor as the present application and are incorporated by reference herein.

An on-wall coffee maker 20 that is affixed to a vertical surface of a wall or cabinet (similar to mounting a clock on a wall) shares many of the advantages of an in-wall coffee but would not require the creation of a wall cavity. The on-wall coffee maker 20 can also include a dedicated water supply.

Figure 2:
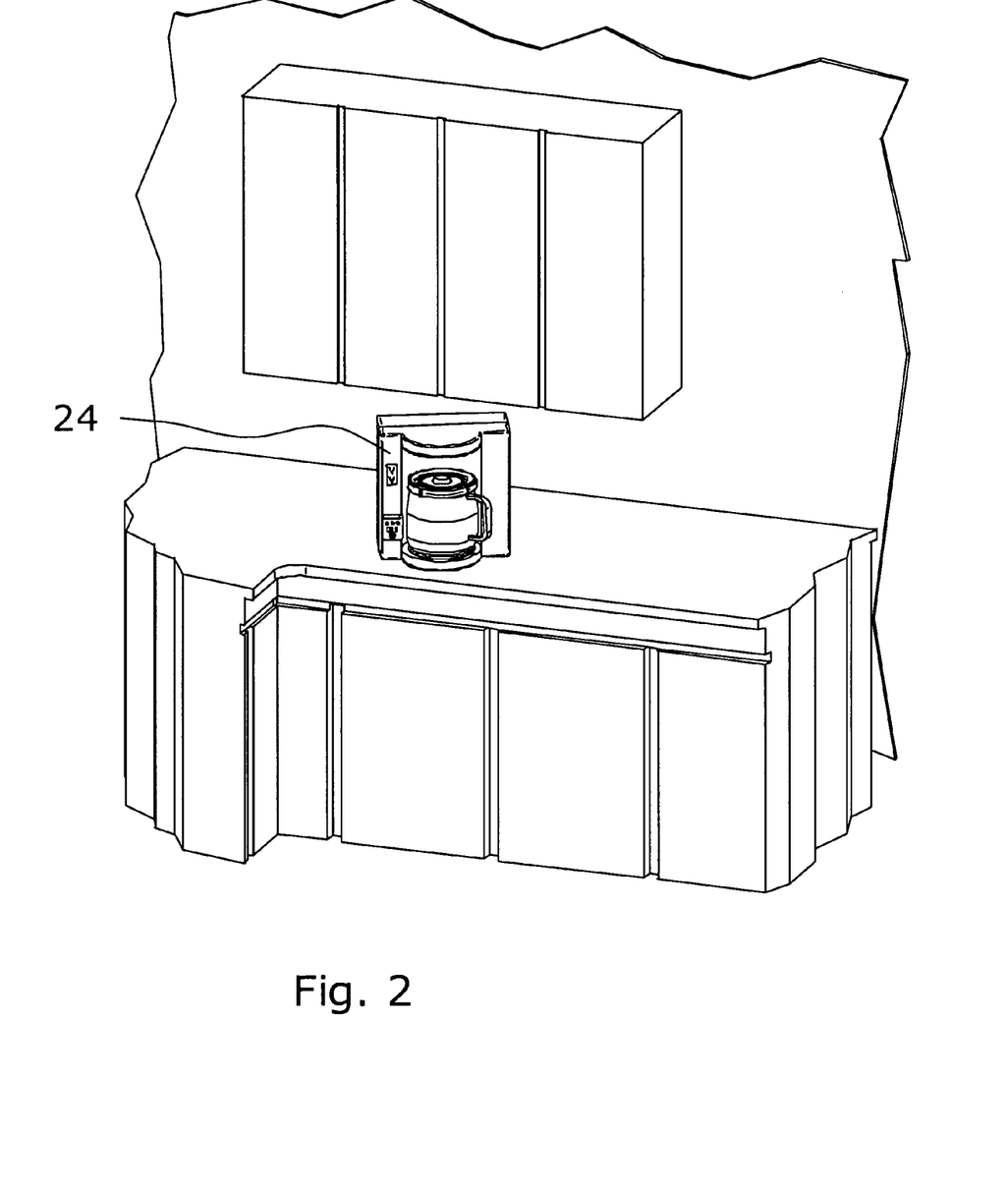
FIG. 2 is a perspective view of a coffee maker according to another embodiment of the invention, shown on a counter top.

FIG. 2 is a perspective view of a coffee maker 24 according to another embodiment of the invention located on counter 26. Coffee maker 24 can be connected to dedicated water supply. Some embodiments of the invention, however, do not require that the coffee maker 24 be connected to dedicated water supply.

Figure 3:
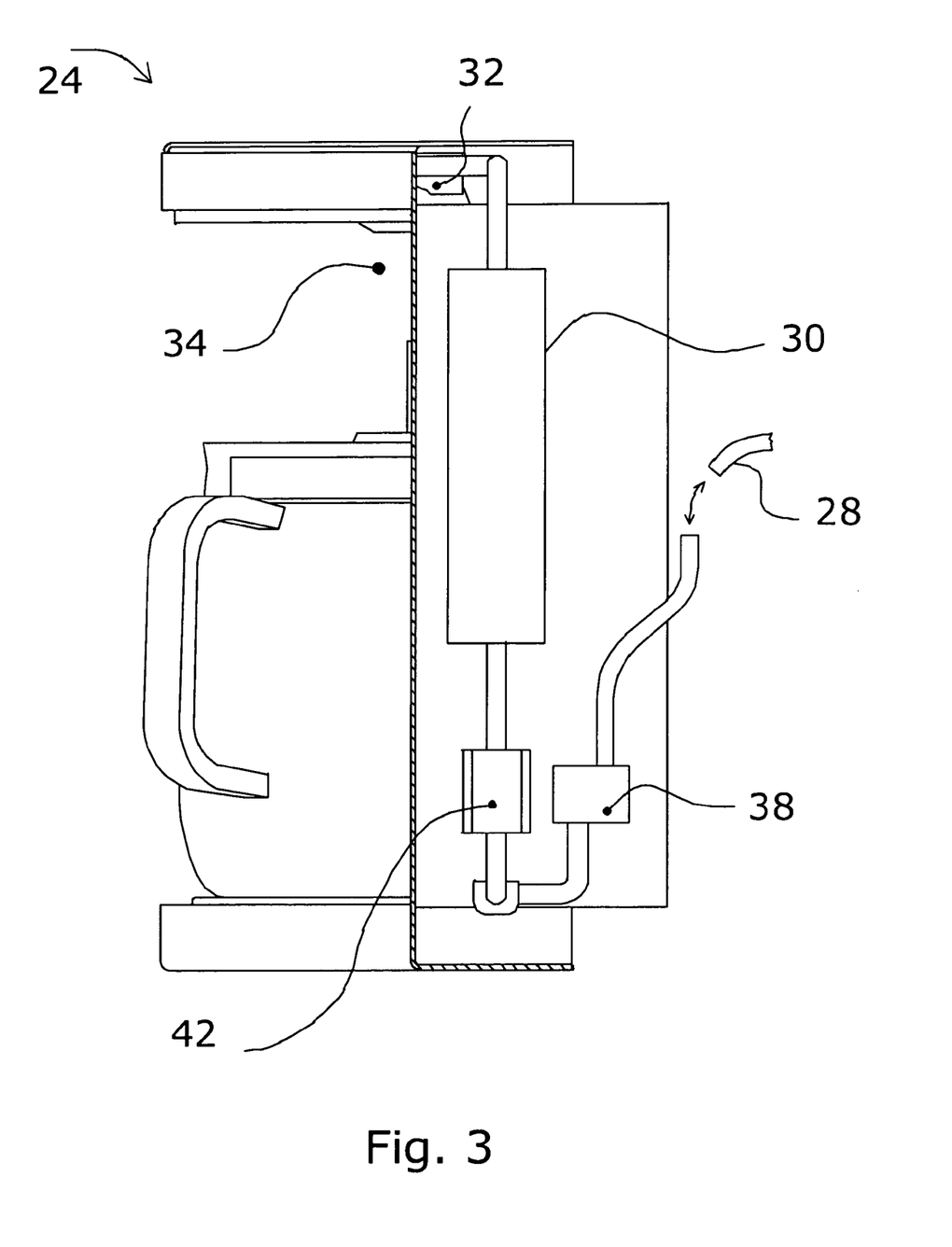
FIG. 3 is a schematic side elevation view of the coffee maker of FIGS. 1 and 2.

FIG. 3 is a schematic side elevation view of the coffee maker 24 according to an embodiment of the invention. The coffee maker 24 is shown connected to dedicated water supply line 28. The coffee maker 24 includes in-line water heater 30 that heats the water from water supply 28 as the water passes through the heater. The in-line water heater 30 acts differently than standard reservoir heaters (not shown) because reservoirs heaters heat a volume of water that statically resides in the heater while the in-line heater 30 heats the water dynamically as it passes through the in-line heater 30.

A thermal sensor 32 is positioned to sense the temperature of the water entering the brewing area 34. Controller 36 (see FIG. 4), responds to the thermal sensor 32 and provides a signal to the in-line heater 30. The signal to the in-line heater 30 can be to turn the in-line heater 30 on or off such that the temperature of the water entering the brewing area 34 is between approximately 195-205° F., which is an ideal brewing temperature range for producing the best-tasting coffee, according to the Coffee Institute and the Specialty Coffee Association of America.

The signal from the controller 36 (see FIG. 4), responsive to the thermal sensor 32, can also adjust the thermal output of the in-line water heater 30 to achieve a water temperature in the brewing area 34 of approximately 195-205° F.

Still referring to FIG. 3, the coffee maker 24 can include a pressure switch or sensor 38 located between the water supply 28 and the water heater 30. While an in-line water heater 30 is shown her in FIG. 3, the pressure switch or sensor 38 can also be operative with a reservoir heater (not shown).

When a pressure switch 38 is used, the switch 38 can be maintained in an "off" state when the water pressure remains above a predetermined amount and flip to an "on" state when the water pressure dips below the predetermined amount.

The controller 36 (see FIG. 4) responds to the pressure switch or sensor 38 to provide a control signal to the coffee maker 24. The control signal can be to turn a portion of the coffee maker 24 on or off.

A valve 42 can be located between the water supply 28 and the water heater 30. The valve 42 is shown here located between the pressure switch or sensor 38 and the water heater 30. However, the valve 42 can be located "upstream" of the pressure switch or sensor 38 or the pressure switch or sensor 38 can be incorporated into the valve 42. The controller 36 (see FIG. 4) can be adapted to respond to the pressure sensor 38 by turning on or off the water heater 30 and further to open or close the valve 42.

The controller 36 (see FIG. 4) can be configured to turn the heater 30 off and the close the valve 42 when the pressure sensor 38 senses a pressure of the supply of water below about 20 PSI or some other predetermined level. Then, the heater 30 does not burn out and the water running at too low a pressure is kept from running through coffee maker 24.

While FIG. 3 shows coffee maker 24, an in-wall or on-wall coffee maker 20 according to other embodiments of the invention could utilize all of the elements described in FIG. 3. The elements of FIG. 3 would be advantageous for in-wall or on-wall coffee makers 20. The in-line heater 30 and thermal sensor 32 would ensure properly brewed coffee every time as it would for any kind of coffee maker. The pressure sensor 38 along with valve 42 and controller 36 (see FIG. 4) would be helpful for the in-wall coffee maker 20 because the water supply 28 would normally be hidden from the user when the coffee maker 20 is mounted in a wall cavity as shown in FIG. 1.

Figure 4:
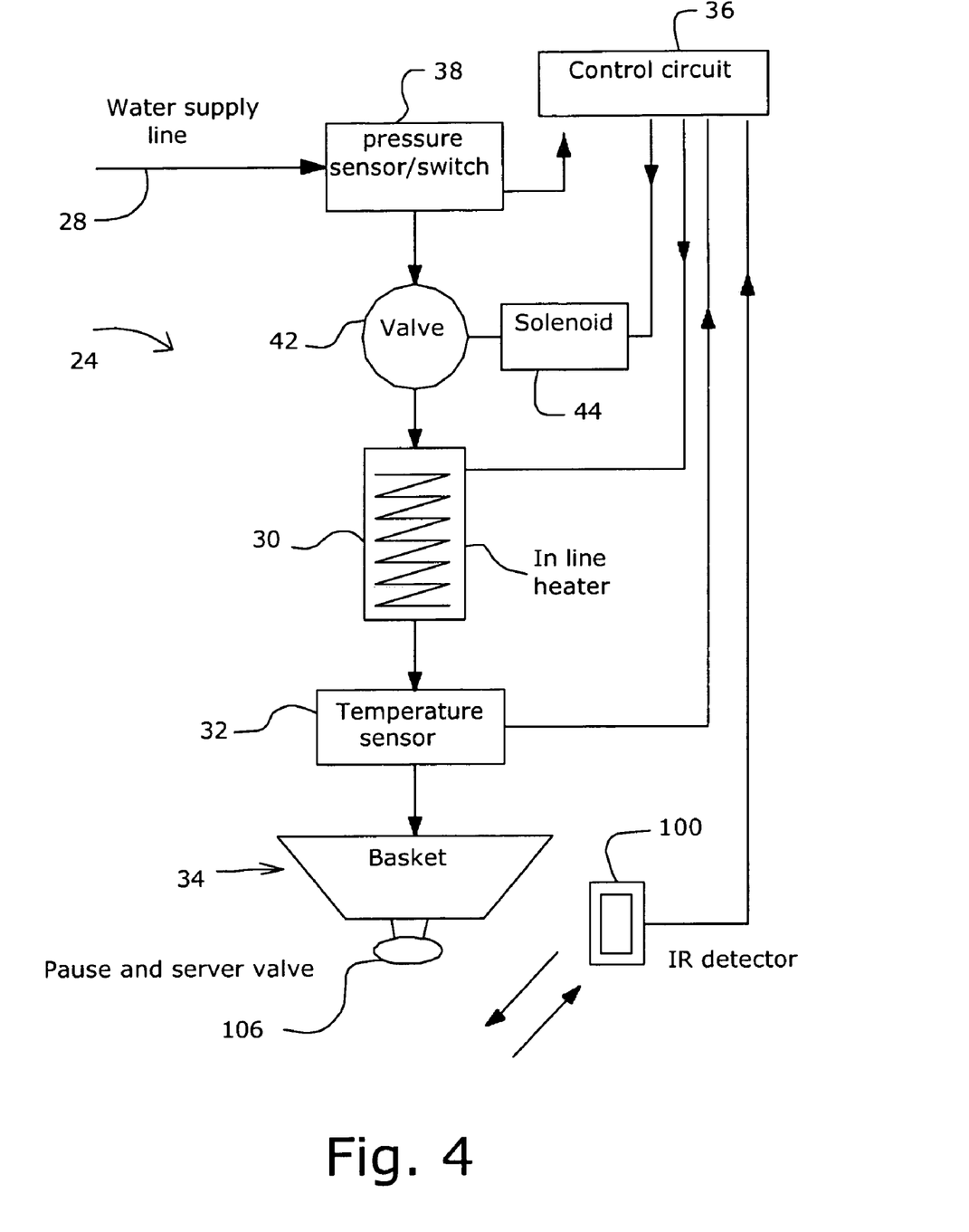
FIG. 4 is a schematic diagram of low pressure and temperature sensing systems according to another embodiment of the invention.

FIG. 4 is a schematic diagram of low pressure and temperature sensing systems in coffee maker 24 according to another embodiment of the invention. FIG. 4 will be used to help describe methods brewing coffee.

Water is supplied to brewing area 34 from water supply 28 by directing the water through the in-line heater 30. The temperature of the water being received in the brewing area 34 is detected by thermal sensor 32. The thermal output of the in-line heater 30 is then controlled by a signal from controller 36 responsive to the thermal sensor 32 so that the water being received by the brewing area 34 is at a predetermined temperature. The temperature of the water received in the brewing area 34 can be about 195-205° F., which is range of temperature preferred for brewing good tasting coffee.

The thermal output of the in-line heater 30 can be controller by turning the in-line heater 30 off for approximately three seconds in response to the thermal sensor 32 detecting the temperature of the water being received in the brewing area 34 to be approximately 205° F. or above. The controller 36 can also be adapted to turn the water heater 30 on when the sensed water temperature is below a threshold value and turn the water heater 30 off when the sensed water temperature is above another higher threshold value.

As the water is supplied to the coffee maker 24 from water supply 28, the pressure of the water supply 28 is detected by pressure switch or sensor 38. The controller 36 turns off a portion of the coffee maker 24 when the pressure detected by pressure switch or sensor 38 is less than a predetermined pressure. The predetermined pressure can be about 20 PSI or can be another selected value set by the pressure switch 38 or by the controller 36.

When an in-line heater 30 is used to heat the water (as opposed to a reservoir heater [not shown]), turning off a portion of the coffee maker 24 can include turning off the in-line heater 30 responsive to a signal from the controller 36 and stopping the supply of water to the coffee maker 24 with valve 42 that can be activated by solenoid 44 responsive to a signal from the controller 36.

While coffee maker 24 is used to describe the elements in FIG. 4, in-wall coffee maker 20 (see FIG. 1) can also utilize the elements shown and described in reference to FIG. 4.

Figure 5:
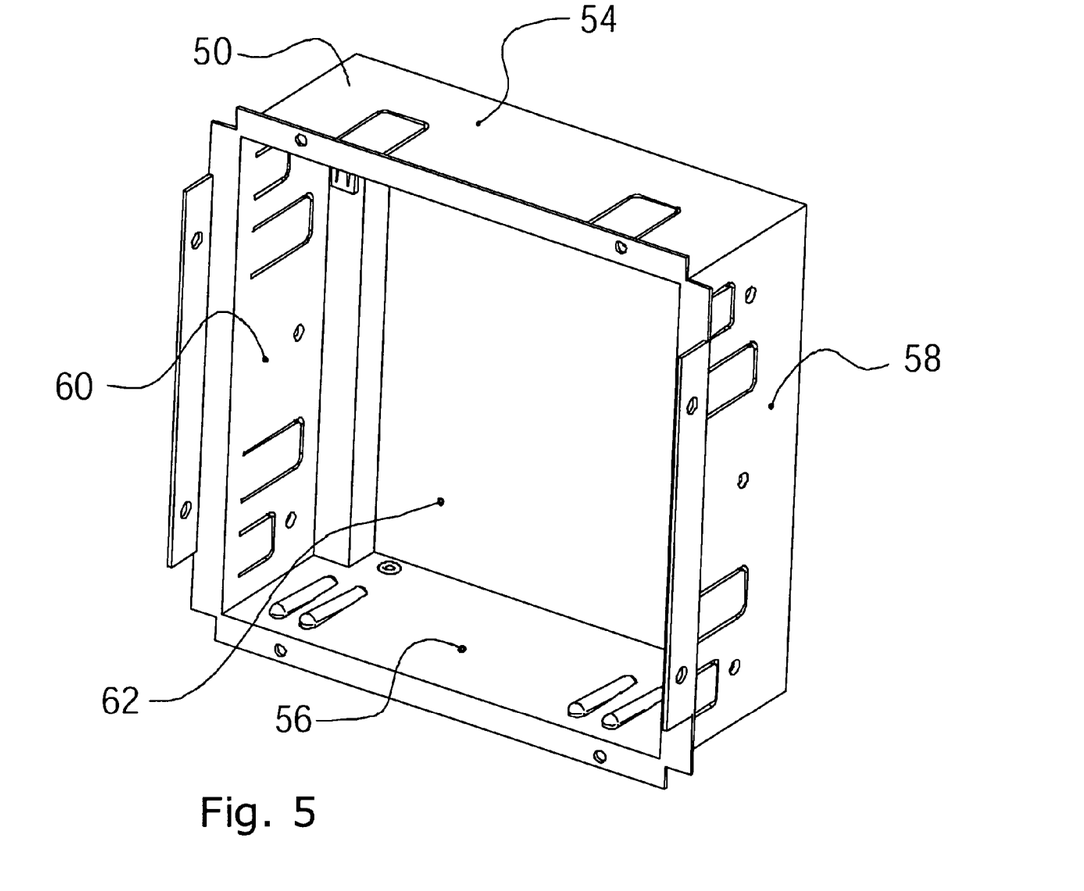
FIG. 5 is a perspective view of a mounting box configured to secure the in-wall coffee maker of FIG. 1 within a wall cavity.
Figure 6:
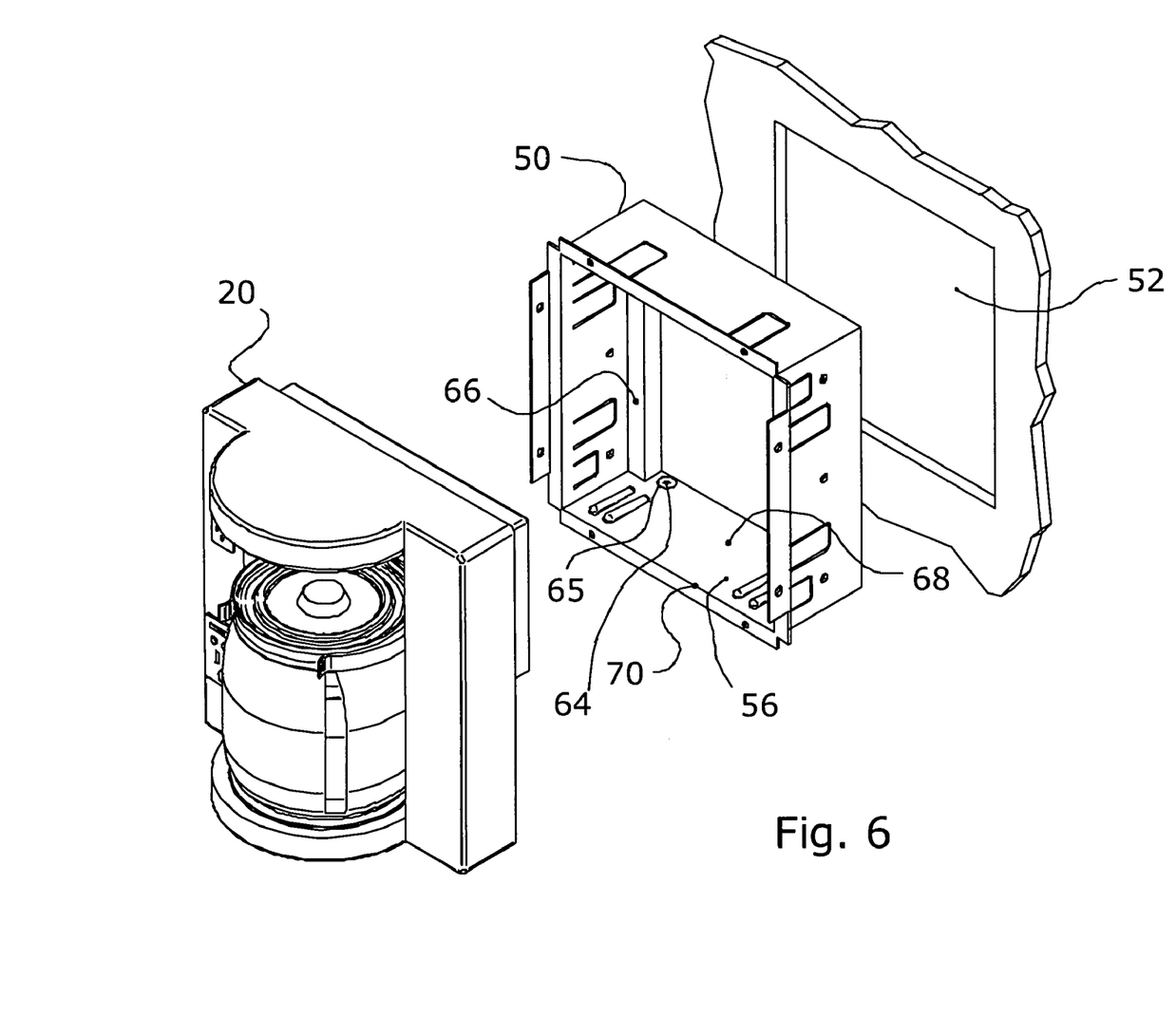
FIG. 6 is an exploded perspective view of the in-wall coffee maker of FIG. 1 and the mounting box of FIG. 5.

FIG. 5 is a perspective view of mounting box 50 configured to secure the in-wall coffee maker 20 of FIG. 1 within a wall cavity 52 (see FIG. 6). The mounting box 50 can be a rough-in sheet metal box that includes a top wall 54, a bottom wall 56, two side walls 58, 60 and a rear wall 62.

Although the material for the mounting box 50 can be made from sheet metal because of its ease of manufacture and adaptability, other materials, such as plastic, wood, etc. could also be used for the mounting box 50. The use of other materials would require only minor modifications to the mounting box 50. Also, although the mounting structure of the foregoing embodiment is a mounting box 50, it should be noted that any mounting structure that is capable of supporting the coffee maker 20 in place in the wall cavity 52 is within the contemplation of the embodiment of the invention.

FIG. 6 is an exploded perspective view of the in-wall coffee maker 20, mounting box 50 and wall cavity 52 illustrating the interface of these three. The mounting box 50 receives and supports the in-wall coffee maker unit 20 within wall cavity 52 and provides the necessary water 64 and power 66 interconnections. The mounting box 50 is configured to have bottom wall 56 positioned below the coffee maker 20 when the coffee maker 20 is installed in the mounting box 50.

The bottom wall 56 provides both structural support to the mounting box 50 and a surface that is slants from an upper rear portion 68 down to a lower front portion 70. The slanted surface allows for run-off of any water escaping from the coffee maker 20 to run out toward the counter space (see FIG.

1) so as not to be trapped in the wall cavity 52. The bottom wall 56 is a solid surface that does not allow any water to escape from the coffee maker 20 to drip down into the wall. The water interconnection 64 enters through the bottom wall 56, but is sealed with rubber grommet 65.

A user would first install the mounting box 50 in the wall cavity 52. Then coffee maker 20 would be mounted in the mounting box 50 with the coffee maker 20 positioned above the bottom wall 56.

Figure 7:
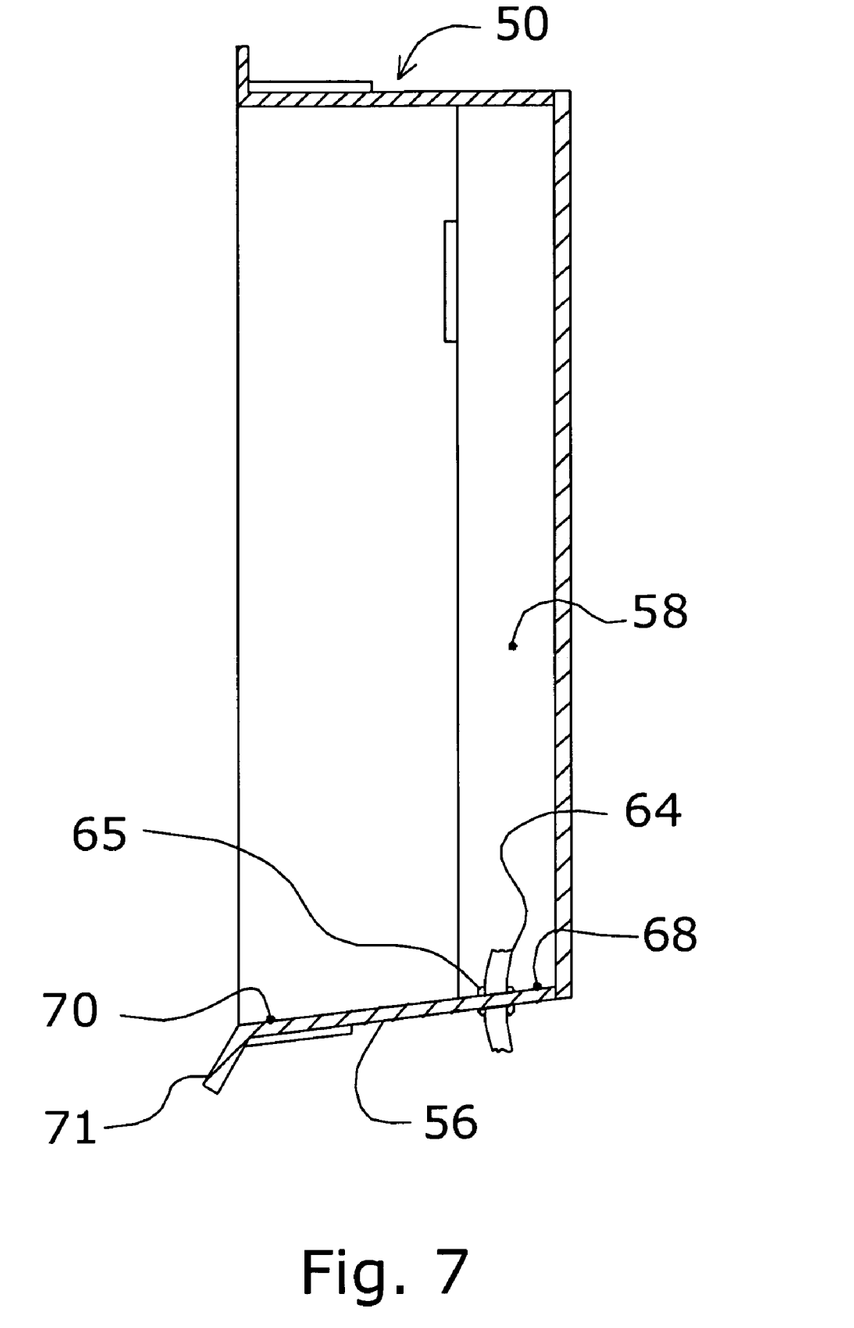
FIG. 7 is a cross-sectional view of the mounting box of FIG. 5 taken along line 7-7 in FIG. 5.

FIG. 7 is a cross-sectional view of the mounting box 50 taken along line 7-7 in FIG. 5. Bottom wall 56 is shown as slanting from an upper rear portion 68 down to a lower front portion 70. The water interconnection 64 is entering the box 50 through the sealed rubber grommet 65.

The box 50 can include a lower lip 71 that extends slantingly outward from the box 50 down and away from the lower front portion 70. By slanting the lower lip 70, any water escaping the coffee maker 20 will be directed along the slanting bottom wall 56 and out and away from a wall. Escaping water would then not be allowed to merely drip down the face of the wall but can be captured on an underlying countertop for easier clean-up.

Figure 8:
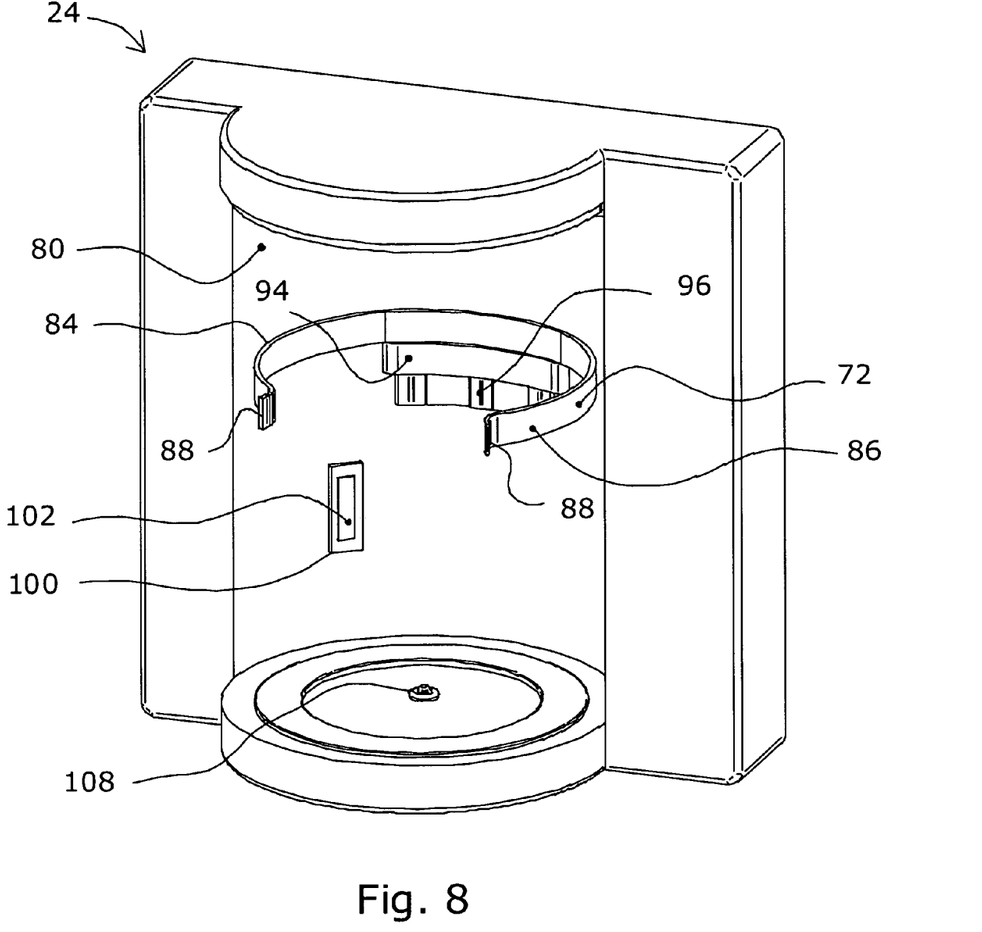
FIG. 8 is a perspective view of a coffee maker according to another embodiment of the invention showing a coffee pot holder, coffee pot detector, and brew basket configuration.

FIG. 8 is a perspective view of a coffee maker 24 according to another embodiment of the invention showing a coffee pot holder 72, coffee pot detector 100, and sealing brew basket 76 (see FIG. 9) inserted into brewing area 34.

The coffee maker 24 includes a coffee pot cavity 80 shaped to receive and hold coffee pot 82 (see FIGS. 1-2). Coffee pot holder 72 is releasably mounted in the coffee pot cavity 80 and includes a pair of opposed resilient arms 84 and 86. The opposed resilient arms 84, 86 are shaped to embrace and receive the upper portion of coffee pot 82 when the coffee pot 82 is located in the coffee pot cavity 80, thereby releasably securing the coffee pot 82.

An alternative coffee pot holder can be a slot (not shown) formed in the coffee pot cavity 80 that is shaped to receive and retain a mating feature (not shown) on a coffee pot 82. The mating feature on the coffee pot 82 would be inserted into the slot thereby securing the coffee pot 82 in the coffee pot cavity 80.

In FIG. 8, each of the opposed resilient arms 84, 86 of the coffee pot holder 72 can be further shaped to have recurved flanges 88 at the outward end of each arm 84, 86. The recurved flanges 88 are shaped so that a rounded surface on the coffee pot 82 cammingly engages the recurved flanges 88 to spread the resilient arms 84, 86 and guide and position the coffee pot 82 to be positioned below the brew basket 76 (see FIG. 9).

The coffee pot holder 72 can include a flange 94 that is structured to be releasably secured in sleeve 96 which is located on a side wall of the coffee pot cavity 80. The releasable nature of this type of attachment of the coffee pot holder 72 can be useful when a user wants to brew coffee into a mug (not shown) rather than into the coffee pot 82. When a mug is used, the coffee pot holder 72 can be in the way of the mug and, thus, the coffee pot holder 72 should be temporarily removed.

Figure 9:
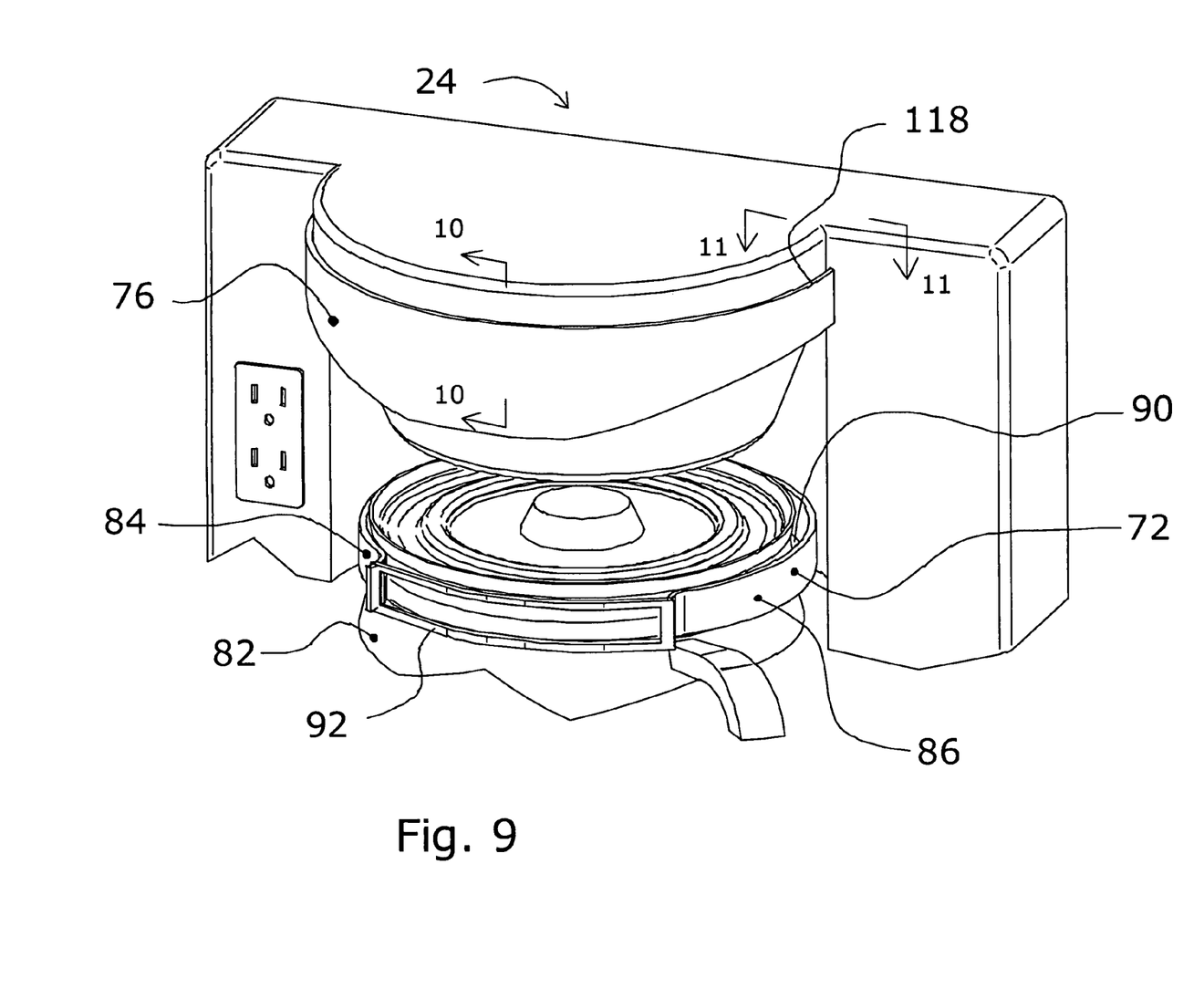
FIG. 9 is a detailed perspective view of the coffee maker of FIG. 8 showing a restraining clip installed on the coffee pot holder.

FIG. 9 is a detailed perspective view of the coffee pot 82 being held in the coffee pot cavity 80 by coffee pot holder 72. The opposed resilient arms 84, 86 embrace the curved upper portion 90 of the coffee pot 82. The coffee pot 82 is further secured with restraining clip 92 placed over the arms 84, 86. The restraining clip 92 can be comprised of a resilient material and can even be comprised of a rubber band. The restraining clip 92 resiliently holds the opposing arms 84, 86 together around the coffee pot 82.

Coffee pot holder 72 and restraining clip 92 can be useful when the coffee maker 24 is an in-wall or on-wall coffee maker 20, especially when the in-wall or on-wall coffee maker 20 is used in unstable environments such a recreational vehicles (RVs) or boats. Even if an RV is being driven or a boat is being rocked by wave action, the coffee pot 82 will be retained in the coffee pot cavity by coffee pot holder 72 and even more securely retained by the addition of restraining clip 92 to the coffee pot holder 72.

Referring to FIGS. 8-9, a method of securing a coffee pot 82 in a coffee maker 84 will now be described. Coffee pot 82 is disposed at least partially in the coffee pot cavity 80 of coffee maker 24. The coffee pot 82 is releasably secured in the coffee pot cavity 80 by engaging an upper portion of the coffee pot 82 with opposed resilient arms 84, 86 as the coffee pot 82 is moved toward the rear portion of the coffee pot cavity 80. This movement causes the resilient arms 84, 86 to spread around the upper portion of the coffee pot 82 and then receive the upper portion of the coffee pot 82 between the arms 84, 86.

The coffee pot 82 can be removed by moving the coffee pot 82 away from the rear portion of the coffee pot cavity 80 thereby causing the resilient arms 84, 86 to spread and release the coffee pot 82.

To further secure the coffee pot 82, the opposed resilient arms 84, 86 can be restrained with restraining clip 92. The restraining clip 92 can resiliently restrain the arms 84, 86 when the clip 92 is made of a resilient material such as a rubber band.

For convenience of a variety of vessels including coffee mugs (not shown), the coffee pot holder 72 can be releasably secured to the coffee maker 24. The coffee pot holder 72 can include flange 94 which can be inserted into sleeve 96 in the coffee pot cavity 80. The coffee pot holder 72 can then be released from the coffee maker 24 by removing the flange 94 from the sleeve 96 and removing the coffee pot holder 72 from the coffee pot cavity 80.

Releasably securing the coffee pot 82 can be useful for in-wall or on-wall coffee maker 20, especially when the in-wall or on-wall coffee maker 20 is installed in relatively unstable environments such as RVs and boats.

Still referring to FIG. 8, the coffee maker 24 includes a detector 100 that is operable to detect the presence of a coffee pot 82 or a coffee mug (not shown) in the coffee pot cavity 80.

The detector 100 is located in the housing of the coffee maker 24 and includes a sensor 100 located on a sidewall of the coffee pot cavity 80 and a controller 36 (see FIG. 4) that is structured to provide a control signal indicating the presence or absence of a coffee pot 82 or mug in the coffee pot cavity 80 responsive to the sensor 100.

The sensor 100 can be an infrared sensor that can include a lens 102 that is adapted to filter environmental light in the coffee pot cavity 80.

Referring to FIGS. 8 and 4, the coffee maker 24 can include an in-line water heater 30 and a brewing area 34 that is structured to receive water from the water heater 30. The coffee maker 24 can further include a valve 42 located between the water heater 30 and the water supply 28 with the valve 42 being operative to stop a flow of water from the water supply 28 to the water heater 30 (and thus to the brewing area 34) a predetermined amount of time after the detector 100 detects that a coffee vessel, such as a coffee pot 82 or coffee mug (not shown), is no longer in the coffee pot cavity 80. The heater, valve and/or the brewing system can be controlled by the controller 36 responsive to signals from the sensor 100.

By shutting off the supply of water from the water supply 28 an overflow of water in the brewing basket 76 can be prevented. The coffee maker 24 can further include a standard pause-and-serve valve 106 on the brewing basket 76 that prevents fluid from escaping the brewing basket 76 when a coffee pot 82 is not in place below the brewing basket 76.

If the coffee maker 24 includes a reservoir (not shown) for storing and heating water, the valve 42 can be structured to stop a flow of water into the reservoir after a predetermined amount of water has entered the reservoir. The valve 42 can be a pump that supplies water to the reservoir and can be turned on and off. The coffee maker 24 can further include a second valve (not shown) located between the reservoir and brewing area 34 that is operative to stop a flow from the reservoir to the brewing area 34 a predetermined amount of time after the detector 100 detects a coffee vessel is no longer in the coffee pot cavity 80. The second valve prevents water from overflowing the brewing basket 76. The second valve can also be a pump that pumps water from the reservoir to the brewing area 34 and can be turned on and off.

A pause-and-serve valve 106 (see FIG. 4) can also be coupled to the brewing basket 76 to prevent fluid from escaping the brewing basket 76 when a coffee pot 82 is not positioned properly below the brewing basket 76.

The detector 100 can also be used in in-wall or on-wall coffee makers 20. The detector 100 and shut-off valve 42 can be useful for preventing water from overflowing the brewing basket 76. In an in-wall coffee maker 20, the detector 100 can include a micro-switch 108 that is structured to detect the presence of a coffee pot 82 or coffee mug (not shown) in the coffee pot cavity 80 by detecting a pressure applied to the micro-switch 108 by the weight of a coffee pot 82 or coffee mug.

Referring to FIGS. 3, 4 and 8, a method of dispensing coffee from a coffee maker 24 will now be described. The coffee maker 24 detects whether a coffee pot 82 or coffee mug (not shown) is located within the coffee pot cavity 80. The detection can be made by detecting an infrared signal emitted from and reflected to the sensor 100. When a coffee pot 82 or mug is not present in the coffee pot cavity 80, the flow of water into the brewing basket 76 is prevented by closing a valve 42 and the water heater 30 can also be turned off until a pot 82 or mug is detected again.

An in-wall or on-wall coffee maker 20 can also detect the presence of a coffee pot 82 or mug using the detector 100. The in-wall coffee maker 20 can also detect the presence of a coffee pot 82 or mug by detecting a pressure of the weight of the coffee pot 82 or mug on a micro-switch 108 located in the coffee pot cavity 80.

Figure 10:
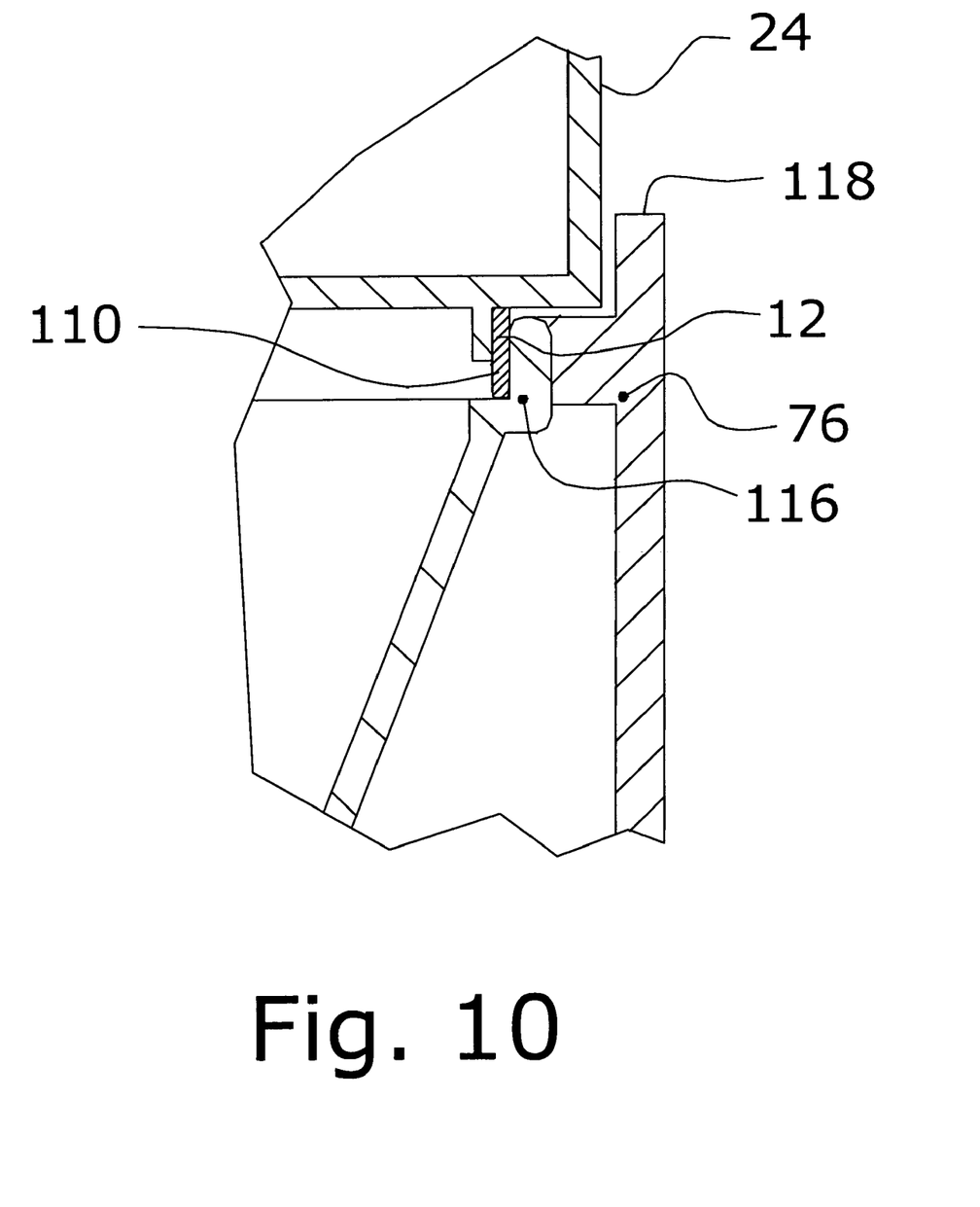
FIG. 10 is a cross-section view of the brew basket and coffee maker of FIG. 9 taken along line 10-10 in FIG. 9 showing the brew basket seal.

FIG. 10 is a cross-sectional view of the brew basket 76 and coffee maker 24 taken along line 10-10 in FIG. 9 showing the brewing basket seal 110. The basket seal 110 is shown mounted on the vertical surface of the lipped shelf structure 12 in brewing basket cavity of coffee maker 24. The brewing basket 76 includes a complementary shaped lipped shelf structure 116 that mates against the brewing basket seal 110 when the brewing basket 76 is installed in the brewing basket cavity. The mating of the brewing basket 76 against the brewing basket seal 110 substantially prevents steam from escaping the brewing basket 76 during a brewing process.

The brewing basket 76 includes a top rim 116 and a front lip 118 that extends around the top rim 116 and across the front portion of the brewing basket 76 (see FIG. 9).

While the brewing basket seal 110 is shown mounted on the coffee maker 24, the seal 110 could be mounted on the brewing basket 76.

It would be useful to use the brewing basket seal 110 in an in-wall or on-wall coffee maker 20 because the in-wall or on-wall coffee maker 20 could be installed in a wall cavity or on a wall that is positioned below kitchen cabinets. Thus, preventing steam from escaping the brewing basket 76 prevents heat and moisture damage to any structures located above the in-wall or on-wall coffee maker 20.

Figure 11:
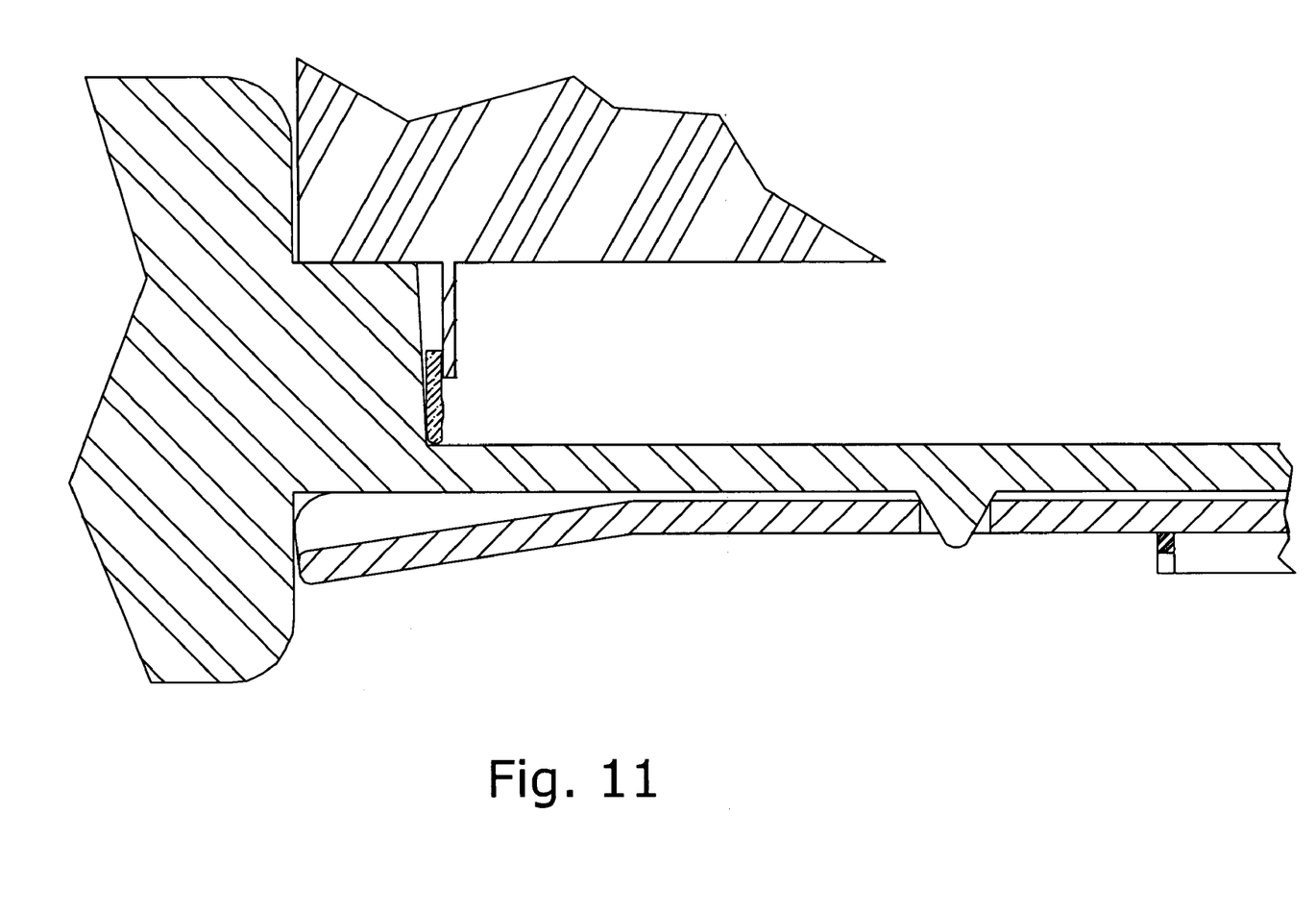
FIG. 11 is a cross-sectional view of the brew basket and coffee maker of FIG. 9 taken along line 11-11 in FIG. 9 showing the fit of the brew basket in the coffee maker.

FIG. 11 is a cross-sectional view of the brewing basket 76 and the coffee maker 24 taken along line 11-11 in FIG. 9 showing how the brewing basket 76 can be releasably secured in the brewing basket cavity. The brewing basket 76 can include a protrusion 120 on a mating surface 122 of the brewing basket 76. The brewing basket cavity can further include a small opening 124 on the mating surface 126, the opening 124 sized to receive the brewing basket protrusion 120.

As the brewing basket 76 is slid into the brewing basket cavity, the protrusion 120 on the basket 76 which is typically made of a pliable material temporarily deforms to allow the protrusion 120 to slide along the mating surface 126. When the brewing basket 76 reaches a position that seals the brewing basket 76 against the brewing basket seal 110 (see FIG. 10), the opening 124 allows the brewing basket 76 to return to its normal width by allowing the protrusion 120 to rest in the opening 124.

The interface between the protrusion 120 and the sides of the opening 124 then prevents the brewing basket 76 from being released from the brewing basket cavity until a predetermined amount of force is exerted on the brewing basket 76. The protrusions and openings 120 and 124 can be sized and structured to alter the required pressure for both insertion and removal of the brewing basket 76 such that pressure from steam emanating from the brewing basket 76 does not force the basket 76 be released from the brewing basket seal 110 (see FIG. 10).

Figure 12:
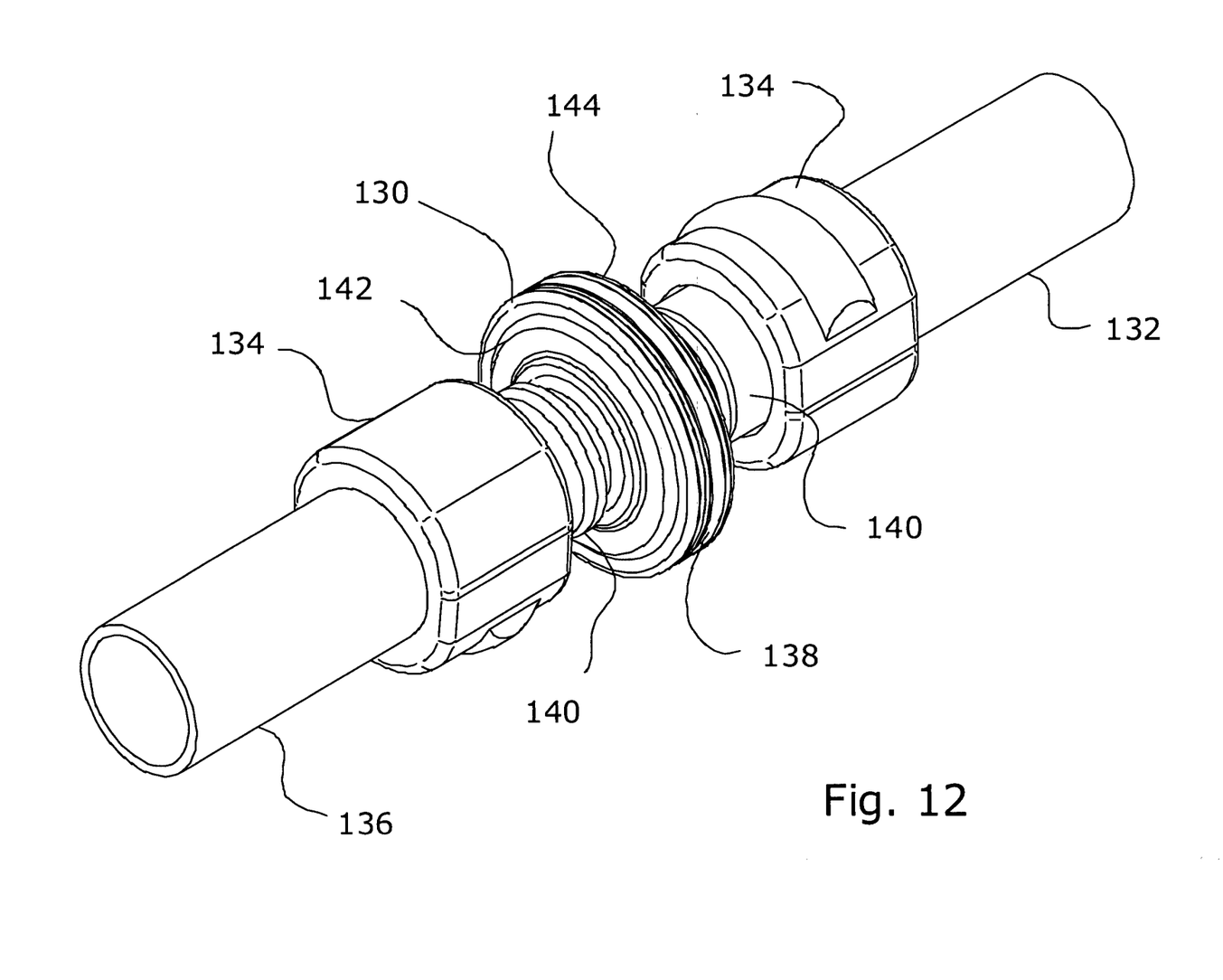
FIG. 12 is a perspective view of an in-line filter according to another embodiment of the invention.

FIG. 12 is a perspective view of an in-line sediment filter 130 for use in filtering sediment from a water supply to an appliance such as a coffee maker 24 according to another embodiment of the invention. Water is supplied to many built-in appliances like the in-wall coffee maker 20 shown in FIG. 1 with dedicated water supply lines. Other appliances that use dedicated water supply lines can include dishwashers, washing machines and refrigerators. While some appliances like refrigerators include a filter designed for improving the taste and quality of water, loose sediment in the water supply lines can still clog the water supply lines before the water ever gets to the filter in the appliance.

The appliance using a dedicated water supply line will include an appliance water intake line 132. A quick connector 134 can be positioned on the intake end of the intake line 132. A quick connector 134 can also be positioned on the outflow end of the water supply line 136. The sediment filter unit 130 is connected to the outflow end of the water supply line 136 and the intake end of the intake line 132 such that the water supply line 136 is in fluid communication with the water intake line 134.

The sediment filter unit 130 includes a sediment filter 138 positioned between to quick connectors 140 that are positioned on opposing ends of the sediment filter unit 130. The quick connectors 140 on the sediment filter unit 130 connect to the quick connectors 134 on the water supply and intake lines 136 and 134. The quick connectors 140 and 134 allow a user to quickly and easily remove the sediment filter 138.

The sediment filter unit 130 can include a first half housing 142 that includes the quick connector 140 and a second half housing 144 that also includes a quick connector 140. The first and second half housings 142, 144 can then be releasably secured to allow for easy replacement of a sediment filter (not shown) placed between the housings 142, 144.

FIG. 12 shows the water supply line 136 and the intake line 132 with female quick-connectors 134 and the sediment filter unit 130 with male quick-connectors 140. This configuration of male and female quick-connectors 140, 134 can be altered without affecting the ability of the sediment filter unit 130 to filter sediment from the water supplied to the coffee maker 20 or other appliances.

The preceding embodiments are exemplary. Those of skill in the art will recognize that the concepts taught herein can be tailored to a particular application in many other advantageous ways. In particular, those skilled in the art will recognize that the illustrated embodiments are but one of many alternative implementations that will become apparent upon reading this disclosure.

Although the specification may refer to "an", "one", "another", or "some" embodiment(s) in several locations, this does not necessarily mean that each such reference is to the same embodiment(s), or that the feature only applies to a single embodiment.

The invention claimed is:

1. A coffee maker, comprising:
   a housing;
   a coffee pot cavity located within the housing;
   a detector operable to detect the presence of a vessel in the coffee pot cavity, the detector located in the housing;
   an in-line water heater located within the housing and structured to couple to a water supply;
   a brewing area located within the housing to contain a supply of coffee grounds and to receive water from the in-line water heater;
   a pause and serve valve coupled to the brewing area; and
   a valve located between the water supply and the brewing area operative to stop a flow of water into the brewing area a predetermined amount of time after the detector detects that a vessel is no longer in the coffee pot cavity.

2. The coffee maker of claim 1, in which the coffee maker includes a water reservoir for storing water.

3. The coffee maker of claim 1, the detector comprising an infrared detector.

4. The coffee maker of claim 1 further comprising a controller operative to turn the water heater off a predetermined amount of time after the detector detects that a vessel is no longer in the coffee pot cavity.

5. The coffee maker of claim 1 wherein the coffee maker is an in-wall coffee maker.

6. The coffee maker of claim 1 wherein the coffee maker is affixed to a vertical surface.

7. The coffee maker of claim 3 wherein the detector further includes a lens adapted to filter environmental light interposed between the infrared sensor and the coffee pot cavity and operable to detect presence or absence of a coffee pot or mug in the cavity without contact therewith.

8. A coffee maker, comprising:
   a housing;
   a coffee pot cavity located within the housing;
   a detector operable to detect the presence of a vessel in the coffee pot cavity, the detector located in the housing;
   a reservoir located within the housing to store a predetermined amount of water from a water supply;
   a water heater located within the housing and thermally coupled to the reservoir;
   a first valve located between the water supply and the reservoir operative to stop a flow of water into the reservoir after a predetermined amount of water has entered the reservoir;
   a brewing area located within the housing to contain a supply of coffee grounds and to receive water from the reservoir;
   a pause and serve valve coupled to the brewing area; and
   a second valve located between the reservoir and the brewing area operative to stop a flow of water into the brewing area a predetermined amount of time after the detector detects that a vessel is no longer in the coffee pot cavity.

9. The coffee maker of claim 8, the detector comprising an infrared detector.

10. The coffee maker of claim 9 wherein the detector further includes a lens adapted to filter environmental light interposed between the infrared sensor and the coffee pot cavity and operable to detect presence or absence of a coffee pot or mug in the cavity without contact therewith.

11. A coffee maker, comprising:
    a housing;
    a coffee pot cavity located within the housing;
    a detector operable to detect the presence of a vessel in the coffee pot cavity, the detector located in the housing;
    a water heater located within the housing structured to receive a supply of water;
    a pressure switch located between the supply of water and the water heater;
    a brewing area located within the housing structured to contain a supply of coffee grounds and to receive water from the water heater; and
    a valve located between the water heater and the supply of water operative to stop a flow of water to the water heater a predetermined amount of time after the detector detects that a vessel is no longer in the coffee pot cavity.

12. The coffee maker of claim 11 further comprising a pause and serve valve coupled to the brewing area.

13. The coffee maker of claim 11 further comprising a controller operative to turn the water heater off a predetermined amount of time after the detector detects that a vessel is no longer in the coffee pot cavity.

14. The coffee maker of claim 11, the detector comprising an infrared detector.

15. The coffee maker of claim 14 wherein the detector further includes a lens adapted to filter environmental light interposed between the infrared sensor and the coffee pot cavity and operable to detect presence or absence of a coffee pot or mug in the cavity without contact therewith.

* * * * *